Patented Sept. 10, 1929.

1,727,468

UNITED STATES PATENT OFFICE.

HANS KÄMMERER, OF MANNHEIM, GERMANY, ASSIGNOR TO GENERAL ANILINE WORKS, INC., OF NEW YORK, N. Y., A CORPORATION OF DELAWARE.

AZO DYESTUFF CONTAINING CHROMIUM.

No Drawing. Application filed January 26, 1928, Serial No. 249,771, and in Germany February 9, 1927.

I have found that a valuable dyestuff containing chromium may be obtained when the dyestuff obtainable from diazotized metanilic acid and salicylic acid is treated with agents which contain chromium. The dyestuff so obtained is distinguished from the chromium dyestuffs of similar composition already known by its clear, green-tinge yellow shade, and also by its excellent fastness. This dyestuff is applicable also for calico printing, very fast yellow shades, with a greenish tinge, being produced. It is also suitable for the production of batik goods, pure yellow effects or bright greens on an indigo ground being produced.

The following example will further illustrate the nature of the said invention which however is not limited thereto. The parts are by weight.

*Example.*

700 parts of the dyestuff obtainable from diazotized metanilic acid and salicylic acid corresponding to the formula:

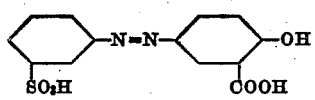

is warmed for a short time with 3000 parts of a solution of chromium formate, containing 196 parts of $Cr_2O_3$, the solution being then evaporated. The resulting chromiferous dyestuff gives very fast clear yellow dyeings with a greenish tinge, on wool.
What I claim is:

As a new article of manufacture the greenish-yellow dyestuff containing chromium, dyeing very fast yellow shades with a greenish tinge which is a chromium compound of the azo dyestuff obtainable from diazotized metanilic acid and salicylic acid.

In testimony whereof I have hereunto set my hand.

HANS KÄMMERER.